(12) United States Patent
Seolas et al.

(10) Patent No.: US 9,842,133 B2
(45) Date of Patent: Dec. 12, 2017

(54) AUDITING OF WEB-BASED VIDEO

(71) Applicant: OBSERVEPOINT, INC, Provo, UT (US)

(72) Inventors: Robert K. Seolas, Alpine, UT (US); John Pestana, Orem, UT (US); Tyler Broadbent, Lehi, UT (US); Alan Martin Feuerlein, Orem, UT (US)

(73) Assignee: OBSERVEPOINT, Inc., Provo, UT (US)

( * ) Notice: Subject to any disclaimer, the term of this patent is extended or adjusted under 35 U.S.C. 154(b) by 380 days.

(21) Appl. No.: 14/485,520

(22) Filed: Sep. 12, 2014

(65) Prior Publication Data

US 2016/0078078 A1    Mar. 17, 2016

(51) Int. Cl.
*G06F 17/30* (2006.01)
*G06F 17/00* (2006.01)

(52) U.S. Cl.
CPC .... *G06F 17/30371* (2013.01); *G06F 17/3082* (2013.01); *G06F 17/30817* (2013.01)

(58) Field of Classification Search
CPC ............. G06F 3/0488; G06F 17/30752; G06F 17/30772; G06F 3/017; G06F 3/0346; G06F 3/0484; G06F 17/30817; G06F 17/30265; G06F 3/013; G06F 17/30699; G06F 2203/04808; G06F 3/0236; G06F 3/0412; G06F 3/0416; G06F 3/0482; G06F 3/04886; G06F 17/3087
See application file for complete search history.

(56) References Cited

U.S. PATENT DOCUMENTS

| | | |
|---|---|---|
| 6,792,458 B1 | 9/2004 | Muret |
| 6,804,701 B2 | 10/2004 | Muret |
| 7,610,289 B2 | 10/2009 | Muret |
| 7,849,202 B2 | 12/2010 | Muret |
| 8,032,564 B2 | 10/2011 | Muret |
| 8,150,983 B2 | 4/2012 | Muret |
| 8,261,362 B2 | 9/2012 | Goodwin |
| 8,429,243 B1 | 4/2013 | Wang |
| 8,516,601 B2 | 8/2013 | Goodwin |
| 8,554,804 B2 | 10/2013 | Muret |
| 8,640,037 B2 | 1/2014 | Goodwin |
| 8,683,051 B2 | 3/2014 | Muret |
| 8,683,056 B2 | 3/2014 | Muret |

(Continued)

OTHER PUBLICATIONS

International Search Report and Written Opinion for PCT/US2014/062112 dated Sep. 17, 2015.

*Primary Examiner* — Yicun Wu
(74) *Attorney, Agent, or Firm* — Workman Nydegger (57) ABSTRACT

A method for auditing a web-based video can comprise receiving validation information associated with one or more video files that are accessible on a webpage. The validation information can comprise one or more time intervals associated with at least one video file. Additionally, the validation information can comprise tag data relating a tag that are associated with the at least one video files. The method can also request through a network connection the at least one video files. The method can then execute the at least one video files. Executing the at least one video file can cause a tag to fire. Additionally, the method can validate the tag by determining whether the tag conforms to the received tag data.

20 Claims, 5 Drawing Sheets

(56) References Cited

U.S. PATENT DOCUMENTS

| | | |
|---|---|---|
| 8,805,946 B1 | 8/2014 | Gommen |
| 8,843,827 B2 | 9/2014 | Koo |
| 8,904,278 B1 | 12/2014 | Anderson |
| 8,990,298 B1 | 3/2015 | Anderson |
| 8,996,986 B2 | 3/2015 | Manion |
| 8,997,081 B1 | 3/2015 | Manion |
| 9,003,552 B2 | 4/2015 | Goodwin |
| 9,081,789 B2 | 7/2015 | Anderson |
| 9,116,608 B2 | 8/2015 | Koo |
| 9,165,308 B2 | 10/2015 | Cook |
| 9,185,016 B2 | 11/2015 | Muret |
| 9,203,905 B1 | 12/2015 | Hong |
| 9,219,787 B1 | 12/2015 | Manion |
| 2007/0047901 A1 | 3/2007 | Ando |
| 2008/0114875 A1 | 5/2008 | Anastas |
| 2008/0256434 A1* | 10/2008 | Morris ............... G06F 17/2247 715/230 |
| 2009/0287713 A1 | 11/2009 | Anderson |
| 2011/0178932 A1 | 7/2011 | Johnson |
| 2013/0080218 A1 | 3/2013 | Wildern |
| 2013/0117778 A1 | 5/2013 | Kannan |
| 2013/0290480 A1 | 10/2013 | Manion |
| 2013/0297775 A1 | 11/2013 | Hong |
| 2013/0297776 A1 | 11/2013 | Hong |
| 2013/0297777 A1 | 11/2013 | Hong |
| 2013/0297778 A1 | 11/2013 | Hong |
| 2014/0041048 A1 | 2/2014 | Goodwin |
| 2014/0089782 A1 | 3/2014 | Cook |
| 2014/0137006 A1 | 5/2014 | Goodwin |
| 2014/0156738 A1 | 6/2014 | Muret |
| 2014/0208216 A1 | 7/2014 | Koo |
| 2015/0019444 A1* | 1/2015 | Purves ............... G06Q 20/382 705/76 |
| 2015/0066587 A1 | 3/2015 | Gommen |
| 2015/0213282 A1 | 7/2015 | Goodwin |
| 2015/0295988 A1 | 10/2015 | Goodwin |
| 2015/0365373 A1* | 12/2015 | Ives ............... H04N 21/23418 709/204 |
| 2016/0004673 A1 | 1/2016 | Cook |

* cited by examiner

AUDITING OF WEB-BASED VIDEO

BACKGROUND OF THE INVENTION

1. The Field of the Invention

This invention relates to systems, methods, and computer program products related to analysis of websites.

2. Background and Relevant Art

As the Internet and the accompanying Internet commerce have expanded, various website owners continuously seek to track a variety of data about individuals who visit their websites. In particular, website owners often wish to gather a variety of different analytic data about the visitors who view their webpage. In many cases, this analytic data can be used to determine what advertisements to display to a visitor and to determine what fees are due to be paid to various external advertisers.

One conventional method for generating analytic data and/or determining what advertisement to provide to provide to website visitors is through the use of tags. In at least one conventional form, a tag is a hidden element within a webpage that causes some action to occur on a webpage when it is fired. In particular, in at least one implementation, a tag is a piece of code that is placed within a webpage and allows a webpage owner to track information about the visitors who download and execute the particular piece of code. For example, a tag can comprise a reference to a transparent GIF or a tracking pixel, which is placed within the code of a webpage. The actual transparent GIF or tracking pixel can be stored on a separate server from the actual webpage. When the client system executes the web page and encounters the code for the tag, the client system will then request the transparent GIF or tracking pixel (referenced within the tag) from the separate server. When the separate server receives the request from the browser for the transparent GIF or tracking pixel, the server can gather various analytic data about the requestor.

For example, once executed, the server providing the GIF or tracking pixel, can gather information such as where the visitor came from (e.g., what webpage or search engine), what keywords were used to find the webpage, whether a particular advertisement directed a visitor to the page, and other related data. In many situations, a webpage can comprise multiple tags from a variety of different parties. For example, a particular webpage may contain a Google Analytics tag, a Facebook tag, a page-counter Tag, a weather tag, and other common tags. In at least one implementation, a tag can merely comprise a particular call to an external advertising server.

In addition to embedding tags within a webpage, tags can also be associated with a video file. For example, when playing a video file on a webpage, the video player can fire tags at specific points and request specific advertisements. In at least one implementation, a video player executes tags in accordance with the Video Ad Serving Template (VAST) specification. As such, tags associated with a video can ensure that the proper advertisements are displayed and can further inform a website administrator how much of a video a particular website visitor viewed.

As Internet speeds have increased and as online entertainment has become more pervasive, a large number of Internet users view Internet video in one form or another. As the viewership of Internet videos has increased, content providers have also become more interested in ensuring that the various tags embedded within their video content are operating correctly.

Auditing Internet video, however, presents several unique challenges. For example, Internet video is generally not provided in a source code form that can be readily parsed and analyzed. Additionally, some video content is launched based upon timed events on a webpage, as such, it is difficult for an audit system to correctly identify and audit all of the video available on a website. Accordingly, there are a number of problems in the art relating to the creation of rules for a tag management system that can be addressed.

BRIEF SUMMARY OF THE INVENTION

Implementations of the present invention provide systems, methods, and computer program products configured to audit tags within Internet-based video files. In at least one implementation, an auditing system validates that tags launch at the proper time within a particular video file. Additionally, in at least one implementation of the auditing system, the system validates that the tags conform to previously established vendor validation rules. Vendor validation rules validate that tags adhere to vendor limitations or requirements. After auditing a video, the auditing system can generate a report to a user of interest.

In an exemplary embodiment, a method for auditing a web-based video in accordance with specifications received from a user comprises receiving validation information associated with one or more video files that are accessible on a webpage. The validation information can comprise one or more time intervals associated with at least one of the one or more video files. Additionally, the validation information can comprise tag data relating to one or more tags that are associated with the at least one of the one or more video files. The method can also comprise requesting through a network connection the at least one of the one or more video files. The method can further comprise executing the at least one of the one or more video files. Executing the at least one of the one or more video files can cause at least one of the one or more tags to fire. Additionally, the method can comprise validating the one or more tags by determining whether the one or more tags conform to the received tag data.

In an additional exemplary embodiment, a system can comprise one or more processors, system memory, and one or more computer-readable media storing computer-executable instructions. When executed by the one or more processors, the computer-executable instructions can cause the computer system to implement a method for auditing a web-based video in accordance with specifications received from a user. The method can comprise requesting information from a user. The requested information can comprise a location of a particular web object (e.g., a video file), a run-time length that is associated with a length of the video file, and tag data relating to one or more tags that are associated with the video file. Additionally, the method can comprise accessing the particular web object. Accessing the particular web object can comprise initiating the video file. Additionally, during a time period at least as long as the run-time length, the system can validate the one or more tags using the tag data.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention extend to systems, methods, and computer program products configured to audit tags within Internet-based video files. In at least one implementation, an auditing system validates that tags launch at the proper time within a particular video file. Additionally, in at least one implementation of the auditing system, the system validates that the tags conform to previously established vendor validation rules. Vendor validation rules validate that tags adhere to vendor limitations or requirements. After auditing a video, the auditing system can generate a report to a user of interest.

For example, an implementation of an auditing system can scan an Internet video and determine, based upon tag signatures, what tags fired and when they fired. Additionally, the auditing system can compare this information to expected results received from an end user ("user validation rules"). The auditing system can then generate a report based upon this comparison. The report can comprise information describing the types of tags that fired, when they fired, whether the firing was at the expected time, whether the tags otherwise conformed to validation rules, and other similar information.

Figure 1:
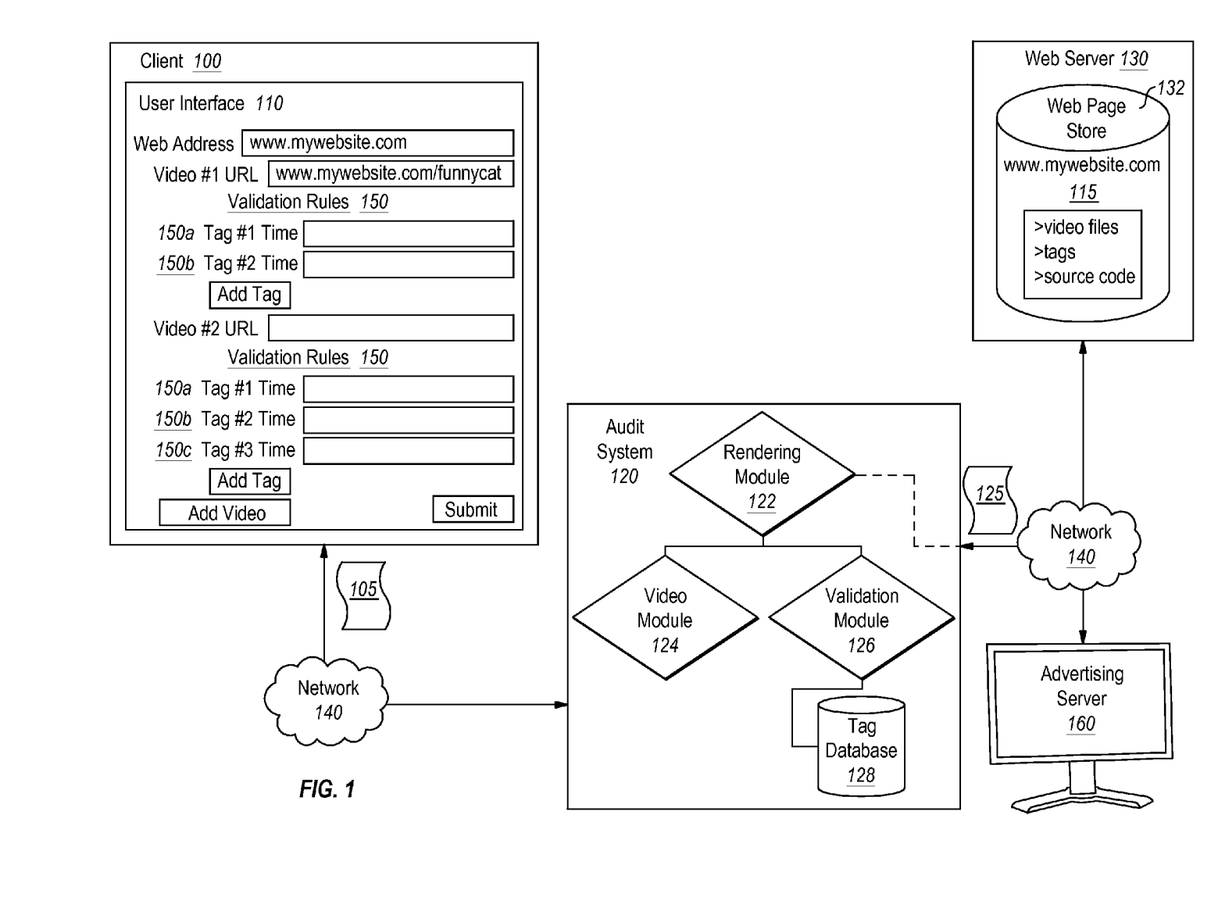
FIG. 1 illustrates an overview schematic diagram of a system for use in accordance with an implementation of the present invention.

Turning now to the figures, FIG. 1 illustrates an overview schematic diagram of a system for use in accordance with an implementation of the present invention. In particular, FIG. 1 depicts a client 100, an audit system 120, and a web server 130. In at least one implementation, the client 100 can transmit data packets 105 to the audit system 120. The audit system 120, in turn, can communicate through data packets 125 with the Web server 130. Though shown as individual modules, in at least one implementation, the client 100, the audit system 120, and the Web server 130 may all be integrated within a single computer system. Alternatively, in at least one implementation, one or more of the systems may be further divided into additional modules.

As depicted in FIG. 1, the client 100 may comprise a system that displays a user interface 110. FIG. 1 further shows that the user interface 110, in turn, may present various fields to the user that enable the user to enter information relating to a tag audit. For example, the user interface 110 may request a target web address, various target video URLs, and various tag validation rules 150 (e.g., 150a-c), such as execution/firing times for the tag during playback of the video file. The web address may be directed towards a particular website that a user desires to audit. The various video URLs may be addressed to the target videos on each respective webpage.

In addition, the user validation rules 150 may comprise a variety of different tag attributes. For example, the user validation rules can comprise firing times, tag types, tag parameters, and other tag related attributes. For instance, a user may desire to audit only a portion of a large number of videos on a webpage.

The video URLs can provide an interface for the user to identify the specific target videos. The various tag validation rules 150 may comprise times that individual tags (150a, 150b, 150c, etc.) are expected to fire with respect to one particular video, or even multiple videos. For instance, a particular video may be associated with two tags, where a first tag (150a) may have an expected firing time at 30 seconds into the video, and a second tag (150b) may be expected to fire one minute into the video.

As depicted in FIG. 1, a user can enter the expected firing times within the validation rules portion 150 of the user interface 110. Relying upon these user validation rules 150, an audit system 120 may be able to audit the requested Internet video for proper tag (150) execution. In one implementation, for example, if the web server 130 detects that the user-identified tags fired at the user-specified time, then the tags were executed properly.

After a user has entered the information targeting particular videos and the user validation rules 150, the client 100 may transmit the targeting information and the validation rules 150 to audit system 120 within the one or more data packets 105. As depicted in FIG. 1, the audit system 120 may comprise a rendering module 122, a video module 124, a validation module 126, and a tag database 128. Similar to what is stated above, one will understand that modules are used within this description for the sake of clarity and illustration. In various implementations, however, modules may be otherwise combined, divided, excluded, or described and still fall within the present invention.

In at least one implementation, upon receiving the target information and the user validation rules 150 from client 100, the audit system 120 (via rendering module 122) can access the web address 115 that was provided through the user interface 110. Accessing the web address 115 may comprise accessing an external web server 130 and downloading information from a web page store 132. Upon receipt, the rendering module 122 can then render the accessed webpage 115. One will appreciate that audit system 120 can render the webpage 115 without necessarily displaying the web page on any particular display device; rather, the system 120 merely prepares the rendering instructions dictated by execution of the webpage 115, and analyzes the rendering instructions.

In rendering the webpage 115, the audit system 120 can use one or more additional modules, such as video module 124, to also activate one or more of the videos designated by the video URLs within the user interface 110. In at least one implementation, for example, audit system 120 can comprise video module 124, which the system then uses to activate the various target videos (e.g., on webpage 115). One will appreciate that the video module 124 may comprise the ability to audit a wide variety of different video formats.

Additionally, the video module 124 may also comprise specific functionality directed towards activating particular videos. For example, a video (e.g., 200, FIG. 2) may require user input before activation. For instance, the video may require that, before playing, a user select a language preference. In at least one implementation, the video module 124 is configured to correctly select the proper language. In additional implementations, the video module 124 may be configured to input age verifications, usernames, user passwords, financial information, and/or other similar video activation credentials.

In at least one implementation, the audit system 120 receives the tags from a web server 130. The web server 130 may be the same server that also comprises the web page store 132. A tag can comprise a simple HTTP formatted URL that directs the client 100 to communicate with an advertising server 160 that is external to, or remote from, the client 100. Various types of tags may also gather information relating to the rendered webpage and/or client 100. For example, the tag may comprise information relating to the topic of the particular rendered webpage and/or video. Additionally, the tag may gather information stored within cookies on the client 100.

In at least one implementation, when playing a video, a video player executes a tag that is associated with the video file. The tag may comprise a request for a video ad serving template (VAST) data structure. The requested VAST data structure may specify the advertisements that should be played, how the advertisements should be played, and what should be tracked as the media is played.

Figure 2:
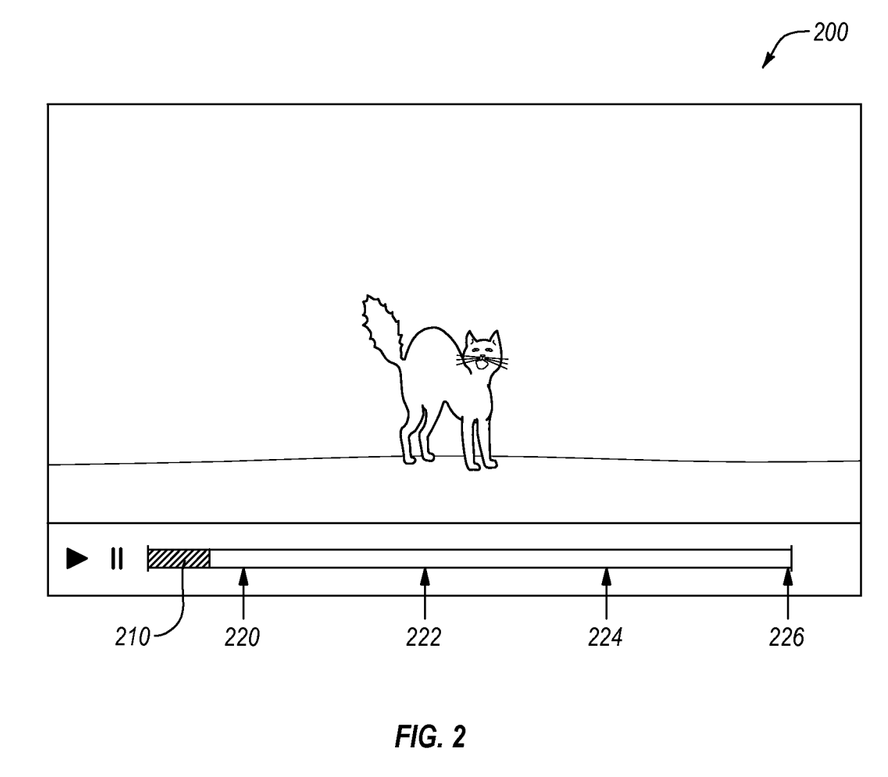
FIG. 2 illustrates an exemplary Internet video and a representation of one or more associated tags that the system can fire in accordance with an implementation of the present invention.

Once a video has been initiated, the audit system 120 can execute the validation module 126, which can determine whether tags 150 associated with the video 200 conform to the user validation rules 150. For example, the validation module 126 can determine whether tags fire within a threshold of the tag times provided in the user interface 110. For instance, a user validation rule may state that a first tag is expected to fire one minute after a video starts, and then a second tag is expected to fire two minutes after the video starts. The validation module 126 can determine whether the first and second tags fire within a threshold of their respective tag times. In at least one implementation, the threshold can comprise a static number (e.g., plus or minus 15 seconds), or it can comprise a dynamic threshold based upon the number of expected tags and the length of the video. For example, in the case of a video with multiple tags (150a, 150b, etc.), the validation module 126 may dynamically set the threshold for each tag to be equal to half the length of time that separates an expected tag with the next respective expected tag.

When validating tags, in at least one implementation, the validation module 126 can identify tag signatures within the information communicated by the rendered web page. For example, various tags may comprise certain identifiable information based upon the specific ad-tracking companies that the respective tags are associated with. For instance, tags that communicate with a particular ad-tracking company, may all comprise a specific URL that communicates with servers associated with the ad-tracking company.

Accordingly, in at least one implementation, the validation module 126 can analyze the links requested by the rendering module 100 and determine if the request linked is associated with a particular tag. In particular, the validation module 126 can access a tag database 128 that comprises tag signatures for a large number of identified tags. The tag signatures can comprise information specifying unique characteristics that identify particular tags. As such, the validation module 126 can rely upon the tag signatures to determine if a particular link that is requested during the playing of a video file is associated with a tag.

Additionally, in at least one implementation, in cases where source code is available, the validation module 126 can identify tag signatures within the source code. For example, the tag database 128 may comprise a library of various code selections from tags. As such, the validation module 126 can identify tags by matching the code selections from the tag database 128 with code selections within the source code.

Turning now to an example of an Internet video with tags, FIG. 2 illustrates an exemplary Internet video and associated tags in accordance with an implementation of the present invention. In particular, FIG. 2 depicts an internet video 200 about a cat. The Internet video 200 can comprise various controls and information, such as, in the illustrated case, play/pause functionality at the bottom of the video 200, and, a video progress indicator 210. Additionally, FIG. 2 also depicts expected tag firing times 220, 222, 224, 226 with respect to the video progress indicator 210. In practice, the tag firing times 220, 222, 224, 226 may not be depicted to a user, but are included within FIG. 2 for the sake of clarity.

In at least one implementation, in order to audit the Internet video 200 of FIG. 2, a user can first enter an associated web address and/or video URL into the user interface 100 of FIG. 1. The web address may be associated with a particular webpage that hosts many videos, while the video URL is associated with the particular cat Internet video 200 of FIG. 2. In addition to entering addresses, the user can enter user validation rules 150 that comprise tag times that correspond to each tag location 220, 222, 224, 226 relative to the length of the video 200. Accordingly, when validating the Internet video 200, the audit system 120 may already know the expected firing times of associated tags.

The validation module 126 can validate the Internet video 200 by detecting tag signatures within a threshold time of the indicated tag locations 220, 222, 224, 226. In at least one implementation, the validation module 126 can also detect tag signatures that do not correspond with one of the provided tag locations 220, 222, 224, 226. For example, a user may be unaware of a particular tag that is associated with an Internet video 200. As such, when the video is initiated, the tag may unexpectedly fire. In this case, the validation module 126 can detect the tag signature of the unexpected tag and record that the tag fired.

Additionally, in at least one implementation, the validation module 126 can verify that the detected tag signatures correspond to previously specified tag types. For example, a user may specify that a first tag of a first type is expected to fire at a first time and a second tag of a second type is expected to fire at a second time. The validation module 126 can verify that the first tag does in fact fire at the first time and that the first tag is of the proper type. Similarly, the validation module 126 can determine that the second tag fires at the proper time, but that the second tag is not of the proper type.

Accordingly, audit system 120 can initiate an Internet video 200 and validate that video 200. In particular, the audit system 120 can validate that the proper tags fire at the proper times within the Internet video 200. Additionally, the audit system 120 may remain at a particular webpage for an extended period of time based upon timing information received from a user through the user interface 110. For example, a user may indicate that a particular tag fires 15 minutes into an Internet video 200. As such, in at least one implementation, the audit system 120 can remain at a particular webpage for at least 15 minutes plus a threshold to determine whether the particular tag properly fires.

Figure 3:
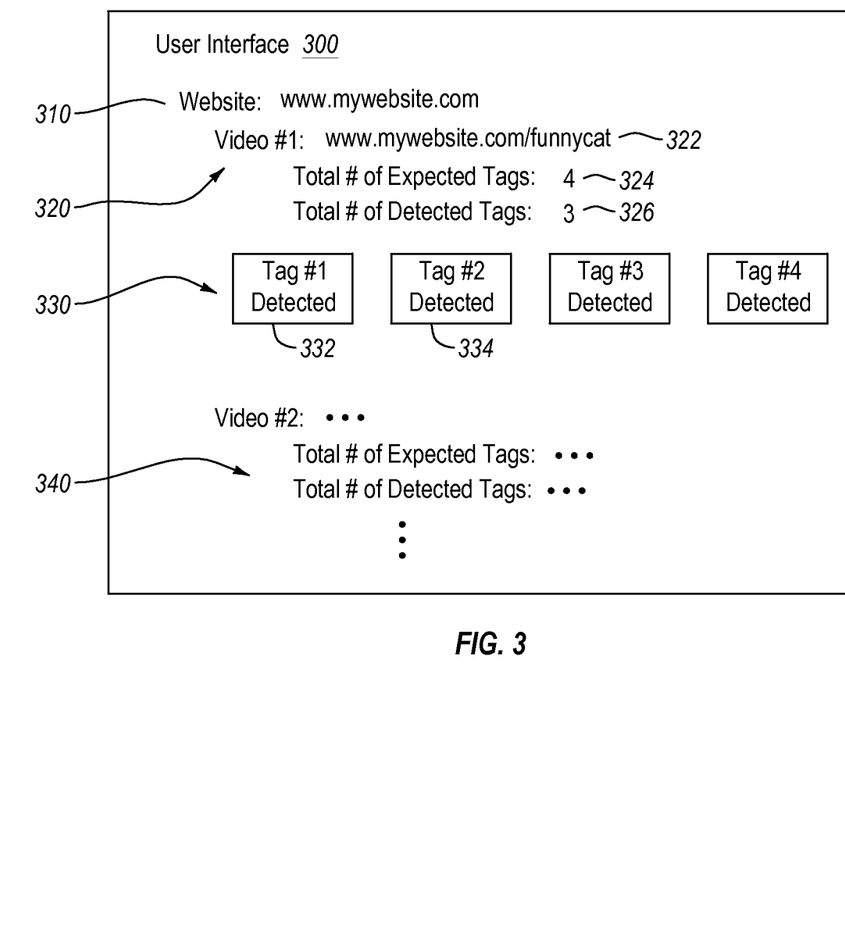
FIG. 3 illustrates an exemplary user interface for reporting an audit in accordance with an implementation of the present invention.

Once the audit system 120 has audited one or more Internet videos 200, the user interface 300 can display a results page. For example, FIG. 3 illustrates an exemplary user interface for reporting an audit in accordance with an implementation of the present invention. As depicted in user interface 300, a variety of different validation outcomes can be presented to a user. For instance, user interface 300 comprises a website indication 310 that indicates the website that was audited. Additionally user interface 300 comprises video indicators 320, 340 that indicate the particular videos and associated URLs that were audited. For example, video indicator 320 displays URL 322 and is associated with the Internet video 200 from FIG. 2.

Video indicator 320 also comprises information summarizing the tag audit. For instance, video indicator 320 displays a total number of expected tags 324 and a total number of detected tags 326. As shown in user interface 300, four tags were expected to be associated with video #1, but only three tags were actually detected.

FIG. 3 also shows that, in addition to displaying a summary of the tag audit, user interface 300 also displays individual tag indicators 330. In at least one implementation, the individual tag indicators 330 display information regarding each individual tag. For example in user interface 300, the individual tag indicators 330 display whether each respective tag was detected 332 or undetected 334. In additional implementations, the individual tag indicators 330 may also comprise information such as the actual firing time of the tag, the type of tag, the amount of information transferred, any variables associated with the tag, the actual tag source code, the tag signature, the external web address accessed by the tag, and other similar information. Accordingly, in at least one implementation, the user interface 300 provides a user with both a summary of a video audit and with detailed information regarding each video and each tag.

Accordingly, FIGS. 1-3 and the corresponding text illustrate or otherwise describe one or more components, modules, and/or mechanisms for auditing Internet videos on webpages. In particular, in at least one implementation, the present invention can audit a particular Internet video for proper tag execution. For example, a particular Internet video may be associated with four different tags. In at least one implementation, the present invention can play an Internet video for a long enough period of time that each tag is given time to fire.

One will appreciate that implementations of the present invention can also be described in terms of flowcharts comprising one or more acts for accomplishing a particular result. For example, FIGS. 4 and 5 and the corresponding text describe acts in a method for creating rules for tag management system. The acts of FIGS. 4 and 5 are described below with reference to the elements shown and described with respect to FIGS. 1-3.

Figure 4:
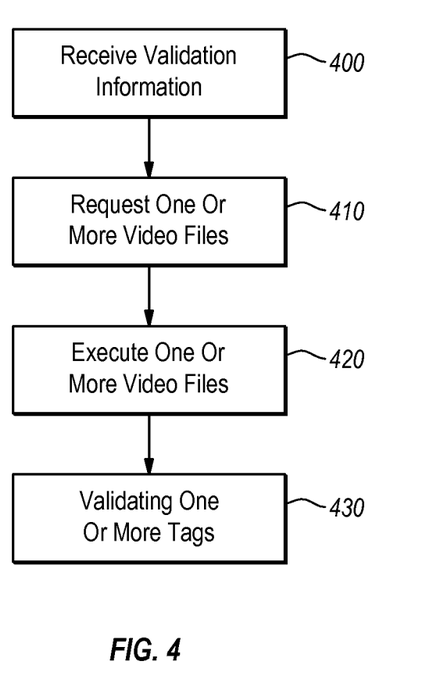
FIG. 4 illustrates a flowchart of a method in accordance with an implementation of the present invention of auditing Internet videos.
Figure 5:
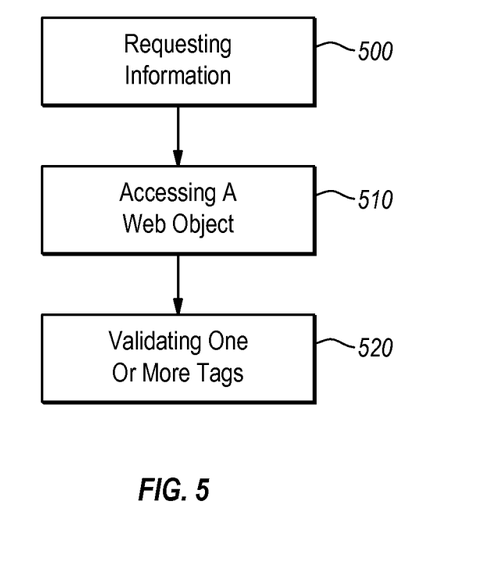
FIG. 5 illustrates a flowchart of another method in accordance with an implementation of the present invention of auditing Internet videos.

For example, FIG. 4 illustrates that a method for auditing a web-based video in accordance with specifications received from a user can include Act 400 of receiving validation information. Act 400 includes receiving validation information associated with one or more video files that are accessible on a webpage. The validation information can comprise a run-time length for each of the one or more video files and tag data relating to one or more tags that are associated with each of the one or more video files. For example, FIG. 1 depicts a user interface 110 that requests information relating to videos and tags associated with each video. The information entered into the user interface 110 is transmitted in a data packet 105 to the audit system 120.

FIG. 4 also shows that the method can comprise act 410 of requesting one or more video files. Act 410 can include requesting through a network connection the one or more video files. The network connection can comprise an Internet connection, a local network connection, or any other computer communication channel. For example, FIG. 1 shows the audit system 120 connecting to a webserver 130 through a network 140. The web server 130 and the audit system 120 communicate to each other through data packets 125.

Additionally, FIG. 4 shows that the method can comprise act 420 of executing one or more video files. Act 420 includes executing the one or more video files, which can cause at least one of the one or more tags to fire. For example, FIG. 1 depicts a rendering module 122 that can execute a video from the web page store 132. Executing the video can include playing the video, playing the video at an adjusted rate (e.g., double speed), analyzing the video stream, or otherwise analyzing the video content.

Further, FIG. 4 shows that the method can comprise act 430 of validating one or more tags. Act 430 includes validating the one or more tags by determining whether the one or more tags conform to the received tag data. For example, in FIG. 1, the validation module 126 can analyze a video file and validate tags that fire during the video. For instance, FIG. 2 depicts an Internet video 200 and associated expected tag locations 220, 222, 224, 226 (shown for exemplary purposes). The validation module 126 can identify whether the proper tags fires at each expected tag location 220, 222, 224, 226.

FIG. 5 illustrates an additional or alternative method for auditing a web-based video in accordance with specifications received from a user. In particular, FIG. 5 shows that the method can include act 500 of requesting information. Act 500 can include requesting information from a user. The requested information can comprise a location of a particular web object, a run-time length, and tag data relating to one or more tags that are associated with the video file. The web object can comprise a video file, and the run-time length can comprise a run-time length of the video file.

Additionally, FIG. 5 shows that the method can comprise act 510 of accessing a web object. Act 510 can include accessing the particular web object by initiating the video file. For example, FIG. 1 depicts that rendering module 122 can access a video file from a web server 130 through a network connection 140. FIG. 1 also shows that the web server 130 can comprise a web page store 132, which stores video files, tags, source code, and other web page related information.

Further, FIG. 5 shows that the method can comprise an act 520 of validating one or more tags. Act 520 can include, during a time period at least as long as the run-time length, validating the one or more tags using the tag data. For example, in FIG. 1 the validation module 126 can validate one or more tags in a video file, while the rendering module 122 renders an associated webpage and/or video file and allows the video to run for at least the run-time length. The validation module 126 can validate the tags and the expected tag locations 220, 222, 224, 226 (FIG. 2), while the rending module 122 allows the Internet video 200 to run for at least the run-time length. In at least one implementation, the system or the user can add a threshold to the run-time length.

Accordingly, one will appreciate in view of the specification and claims herein that implementations of the present invention allow a user to validate that tags associated with a video are properly configured. Additionally, in at least one implementation, a user is able to specify the length of a particular Internet video of interest, and expected firing times for associated tags. Additionally, implementations of the present invention can identify unexpected tags that fire during the playing of an Internet video.

As such, implementations described above provide methods and systems for validating tags within a webpage, which can enhance the ability of website owners to audit advertising efficiency and revenue. In particular, conventional methods of auditing tags within webpages fail to properly audit tags that are embedded within internet-based video. As internet content continues to move towards video based delivery, conventional auditing methods fail to accurately account for tags within the video. One will understand that failing to audit tags can result in lost advertising revenue, failed advertising campaigns, overpayment for advertising, or other similar problems. Accordingly, implementations of the present invention provide a website owner with significant tools for managing tags within a webpage.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computerized environment comprising an auditing system and a website having one or more web pages, a method of the auditing system auditing a web-based video in accordance with specifications received from a user, the method comprising the acts of:
  receiving validation information associated with one or more video files that are accessible on a webpage, wherein the validation information comprises:
    one or more time intervals associated with at least one of the one or more video files, each of the one or more time intervals comprising a specified time within the at least one of the one or more video files that one or more tags associated with the at least one of the one or more video files are to launch, the one or more tags each causing an action to occur upon launch, and
    tag data relating to the one or more tags that are associated with the at least one of the one or more video files;
  requesting through a network connection the at least one of the one or more video files;
  executing the at least one of the one or more video files, wherein executing the at least one of the one or more video files causes at least one of the one or more tags to fire; and
  validating the one or more tags, wherein validating the one or more tags comprises:
    determining whether at least one of the one or more tags launched in accordance with the one or more time intervals, and
    determining whether the one or more tags conform to the received tag data.

2. The method of claim 1, further comprising reporting results of the validation.

3. The method of claim 2, wherein the act of reporting comprises generating a summary report of the one or more video files having a corresponding tag that failed validation.

4. The method of claim 1, further comprising:
  receiving one or more user-created validation rules; and
  determining whether the at least one of the one or more tags conforms with a user-created validation rule.

5. The method of claim 1, wherein the tag data further comprises specific times relative to the run-time length that each respective tag of the one or more tags is expected to fire.

6. The method of claim 5, wherein executing the at least one of the one or more video files comprises:
  loading a particular webpage, wherein the particular webpage comprises a first video file of the one or more video files; and
  waiting on the particular webpage for a time period that is at least as long as a run-time length associated with the first video file.

7. The method of claim 6, further comprising waiting on the particular webpage for a time period that is at least as long as a run-time length associated with the first video file plus a first threshold.

8. The method of claim 6, further comprising:
  identifying a first specific time that a first tag that is associated with the first video is expected to fire;
  determining that the first tag did not fire within the identified first specific time plus a first threshold;
  recording that the first tag did not fire during the identified first specific time plus the first threshold; and
  waiting for a second tag that is associated with a second specific time to fire, wherein the second tag is also associated with the first video.

9. The method of claim 6, further comprising:
  detecting a particular tag firing;
  determining that the particular tag firing occurred within the specific time plus a respective threshold; and
  recording that the particular tag fired.

10. A computer system, comprising:
  one or more processors;
  system memory; and
  one or more computer-readable media storing computer-executable instructions that, when executed by the one or more processors, cause the computer system to implement a method for auditing a web-based video in accordance with specifications received from a user, the method comprising:
  requesting information from a user, wherein the requested information comprises:
    a location of a particular web object, wherein the web object comprises a video file;
    a run-time length, wherein the run-time length is associated with a length of the video file; and
    tag data relating to one or more tags that are associated with the video file, the one or more tags causing an action to occur upon launch;
  accessing the particular web object, wherein accessing the particular web object comprises initiating the video file; and
  during a time period at least as long as the run-time length, validating the one or more tags, wherein validating the one or more tags comprises:

determining whether at least one of the one or more tags launched in accordance with the one or more time intervals, and determining whether the one or more tags conform to the received tag data.

11. The system of claim 10, wherein the tag data comprises:

a first expected firing time of a first tag; and a second expected firing time of a second tag.

12. The system of claim 11, wherein both the first expected firing time and the second expected firing time are with respect to the run-time length.

13. The system of claim 11, wherein validating the one or more tags using the tag data comprises:

determining whether the first tag fires within a threshold amount of the first expected time; and determining whether the second tag fires within a threshold amount of the second expected time.

14. The system of claim 11, wherein validating the one or more tags using the tag data comprises:

determining that the first tag did not fire within a threshold amount of the first expected time;

recording that the first tag did not fire within a threshold amount of the first expected time; and determining whether the second tag fires within a threshold amount of the second expected time.

15. The system of claim 11, wherein validating the one or more tags using the tag data comprises detecting one or more tag signatures.

16. The system of claim 15, wherein detecting one or more tag signatures comprise:

analyzing a URL that is called within a threshold time of the run-time; and determining that the URL comprises a portion of text that is associated with a particular tag.

17. The system of claim 10, wherein the particular web object comprises at least one webpage, which at least one webpage further comprises the video file.

18. The system of claim 17, wherein accessing the particular web object further comprises:

accessing the at least one webpage; and providing the at least one webpage with one or more inputs required to initiate the video file.

19. The system of claim 18, wherein the requested information from the user comprises the one or more inputs.

20. A computer program product comprising one or more computer storage media having stored thereon computer-executable instructions that, when executed at a processor, cause the computer system to perform a method for auditing a web-based video in accordance with specifications received from a user, the method comprising:

receiving validation information associated with one or more video files that are accessible on a webpage, wherein the validation information comprises:

one or more time intervals associated with at least one of the one or more video files, each of the one or more time intervals comprising a specified time within the at least one of the one or more video files that one or more tags associated with the at least one of the one or more video files are to launch, the one or more tags each causing an action to occur upon launch, and tag data relating to the one or more tags that are associated with the at least one of the one or more video files;

requesting through a network connection the at least one of the one or more video files;

executing the at least one of the one or more video files, wherein executing the at least one of the one or more video files causes at least one of the one or more tags to fire; and validating the one or more tags, wherein validating the one or more tags comprises:

determining whether at least one of the one or more tags launched in accordance with the one or more time intervals, and determining whether the one or more tags conform to the received tag data.

* * * * *